Sept. 17, 1940.  J. F. CHALUPA  2,215,171

TURBINE BLADE MANUFACTURE

Filed April 15, 1939

INVENTOR
JOSEPH F. CHALUPA.
BY
a. B. Ravis
ATTORNEY

Patented Sept. 17, 1940

2,215,171

UNITED STATES PATENT OFFICE 2,215,171

TURBINE BLADE MANUFACTURE

Joseph F. Chalupa, Norwood, Pa., assignor to Westinghouse Electric & Manufacturing Company, East Pittsburgh, Pa., a corporation of Pennsylvania Application April 15, 1939, Serial No. 267,967

3 Claims. (Cl. 29—23.5)

This invention relates to turbine blading and more particlarly to a blade unit comprised by a plurality of blades integral with a single root, together with a method of forming such blade units.

A further object of the invention is the provision of a method of forming a blade unit consisting of a plurality of blades integral with a single root, which includes forming a fluid passage, securing a shroud piece in closing relation to the open end of the passage, and heat-treating the structure prior to final machining thereof.

These and other objects are effected by my invention as will be apparent from the following description and claims taken in connection with the accompanying drawing, forming a part of this application, in which:

Figure 1:
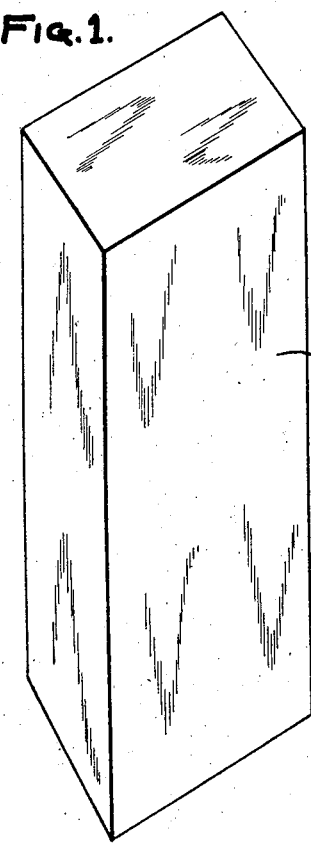
Fig. 1 is a perspective view of a blank from which the blade unit may be formed.
Figure 2:
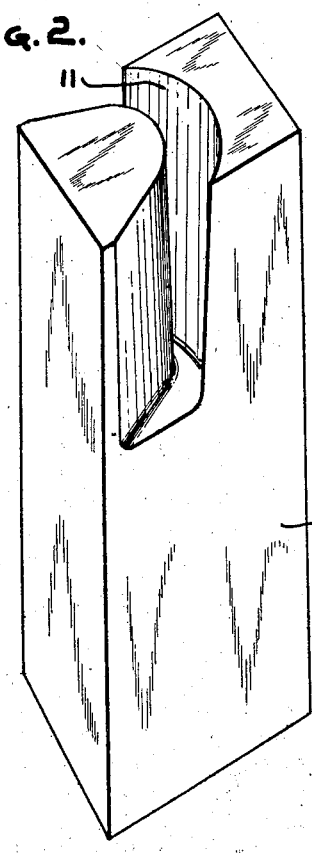
Fig. 2 is a similar view showing the blank with a fluid passage formed in one end thereof.

Referring now to the drawing more in detail, Fig. 1 shows a blank 10 of rectangular cross-section having side, end, top and bottom faces. In accordance with the invention, the first step in the formation of the blade unit is the machining of the fluid passage 11 in the top face of the blank 10, preferably by milling. This passage is transversely curved from side face to side face of the blank and extends from the top face toward the bottom face for a part of the length of the blank.

The top open end of the passage 11 is then closed by a shroud piece 12 shaped to fit within the end of the passage and secured thereto in any desired manner, preferably, by welding at 13.

Figure 3:
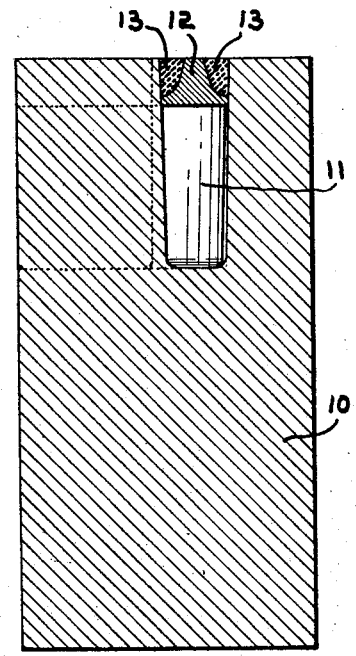
Fig. 3 is a transverse sectional view of the structure shown in Fig. 2, with a shroud piece welded in closing relation to the open end of the fluid passage.
Figure 6:
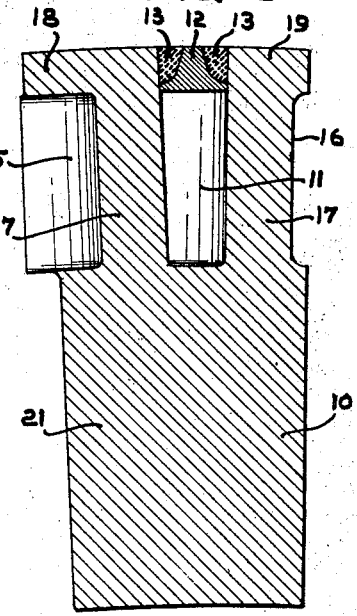
Fig. 6 is a sectional view taken along the line VI—VI of Fig. 4, looking in the direction of the arrows; and, Fig. 7 is a plan view of the structure shown in Figs. 4 to 6.
Figure 7:
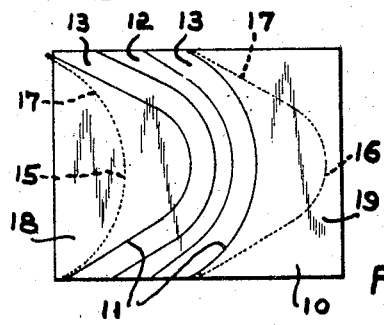

Due to this welding, internal stresses are set up within the structure, and it is desirable that these be removed prior to final machining of the blade unit. Therefore, the next step is to heat-treat the structure shown in Fig. 3 to relieve the same of all internal stresses. Thereafter, the unit may be finish-machined, preferably by the formation of the concave and convex surfaces 15 and 16, respectively, (Fig. 6) which, in co-operation with the fluid passage 11, provide blade portions 17 having shroud portions 18 and 19 integral with their outer ends.

Figure 4:
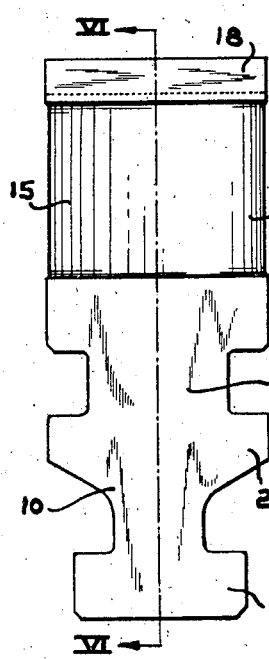
Fig. 4 is a front elevational view of the blade unit in its final form.
Figure 5:
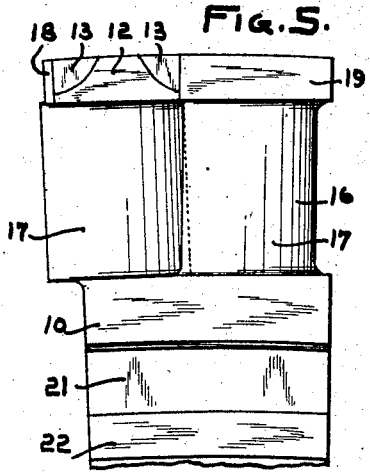
Fig. 5 is a broken side elevational view of the structure shown in Fig. 4.

The root portion 21 of the structure may be finish-machined in any desired manner, Figs. 4 and 5 showing the root 21 in the form of a double-T having spaced pairs of lateral lugs 22 and 23 for engagement with corresponding projecting ribs on a turbine rotor (not shown).

It will be apparent that the blade root 21 may be machined to any desired form, that is, single or double-T root, side entry, straddle T, pin, inverted, serrated, etc.

While I have shown my invention in but one form, it will be obvious to those skilled in the art that it is not so limited, but is susceptible of various changes and modifications without departing from the spirit thereof, and I desire, therefore, that only such limitations shall be placed therupon as are specifically set forth in the appended claims.

What I claim is:

1. A method of producing a turbine blade unit consisting of a plurality of blades integral with a single root, comprising providing a blank of rectangular cross-section; said blank having side, end, top, and bottom faces; forming a fluid passage in the top face thereof; said passage having its ends opening through the opposite side faces of the blank; permanently securing a shroud piece in closing relation to the open top of the passage; heat-treating the structure to remove stresses therein; and machining the blank to final form.

2. A method of producing a turbine blade unit consisting of a plurality of blades integral with a single root, comprising providing a blank of rectangular cross-section; said blank having side, end, top and bottom faces; forming a fluid passage in an end thereof; said passage having its ends opening through the opposite faces of the blank; welding a shroud piece in closing relation to the open top of the passage; heat-treating the structure to remove stresses therein; and machining the blank to final form.

3. A method of producing a turbine blade unit consisting of a plurality of blades integral with a single root, comprising providing a blank of rectangular cross-section; said blank having side, end, top and bottom faces; milling a fluid passage in an end thereof, said passage having its ends opening through the opposite faces of the blank; forming a shroud piece to fit in the open top of the passage; welding said shroud piece to the walls of the passage adjacent the upper edges of the latter; heat-treating the structure to remove stresses therein resulting from the welding; and machining the blank to final form.

JOSEPH F. CHALUPA.